(12) United States Patent
Yang

(10) Patent No.: US 7,482,788 B2
(45) Date of Patent: *Jan. 27, 2009

(54) BUCK CONVERTER FOR BOTH FULL LOAD AND LIGHT LOAD OPERATIONS

(75) Inventor: Ta Yang Yang, Milpitas, CA (US)

(73) Assignee: System General Corp., Taipei (TW)

( * ) Notice: Subject to any disclaimer, the term of this patent is extended or adjusted under 35 U.S.C. 154(b) by 213 days.

This patent is subject to a terminal disclaimer.

(21) Appl. No.: 11/247,209

(22) Filed: Oct. 12, 2005

(65) Prior Publication Data

US 2007/0080672 A1 Apr. 12, 2007

(51) Int. Cl.
G05F 1/613 (2006.01)
G05F 1/00 (2006.01)
(52) U.S. Cl. ............................ 323/224; 323/284
(58) Field of Classification Search .............. 323/282, 323/284, 288, 271, 224
See application file for complete search history.

(56) References Cited

U.S. PATENT DOCUMENTS

| 6,724,174 | B1 * | 4/2004 | Esteves et al. ............. 323/224 |
| 6,753,675 | B2 * | 6/2004 | Harrison .................... 323/281 |
| 2005/0017702 | A1 * | 1/2005 | Kernahan et al. .......... 323/282 |
| 2005/0116697 | A1 * | 6/2005 | Matsuo et al. ............. 323/282 |
| 2007/0090816 | A1 * | 4/2007 | Yang ........................ 323/282 |

* cited by examiner

*Primary Examiner*—Shawn Riley
(74) *Attorney, Agent, or Firm*—Bacon & Thomas, PLLC

(57) ABSTRACT

A high efficiency buck converter has power-saving means to improve the efficiency under both heavy load and light load conditions. A first circuit generates an oscillation signal and a power-saving signal in response to a feedback signal. In reference to the feedback signal and the oscillation signal, a second circuit generates switching signals to control switching devices. An off-time of the switching signal increases in response to a decrement of load. The power-saving signal turns off the switching devices and parts of control circuits of the buck converter during the off-time of the switching signal for saving power under light load conditions.

11 Claims, 12 Drawing Sheets

BUCK CONVERTER FOR BOTH FULL LOAD AND LIGHT LOAD OPERATIONS

BACKGROUND OF THE INVENTION

1. Field of the Invention

The present invention relates to buck converters, switching regulators and power converters.

2. Description of Related Art

In applications for computers, communication and consumer products, buck converters are widely applied to provide regulated output voltages such as 3.3V, 2.5V, 1.8V, 0.9V etc. from a higher input voltage, such as 12V. Among these applications, PWM (pulse width modulation) is a switching technology mainly used. In addition, a synchronous rectifying technology is applied to improve the efficiency of buck converters under heavy load conditions.

FIG. 1 shows a conventional buck converter. A switch 20 is coupled to an input voltage $V_{IN}$ of the buck converter. With the operation of the switch 20, the power of the input voltage $V_{IN}$ will be converted to an output voltage $V_O$ via an inductor 30. A voltage divider formed by resistors 51 and 52 is coupled from the output voltage $V_O$ of the buck converter to a ground reference level. The voltage divider provides a signal $V_{FB}$, which is proportional to the output voltage $V_O$, to a control circuit 10. The control circuit 10 outputs a switching signal $S_{W1}$ in response to the signal $V_{FB}$ to turn on/off the switch 20 to achieve the voltage regulation. A diode 22 is coupled between the switch 20 and the ground reference level to cycle a current of the inductor 30 when the switch 20 is turned off.

FIG. 2 is a known buck converter having synchronous rectifying function. A switch 25, which acts as a synchronous rectifier, is used to reduce the power loss caused by a voltage drop of the diode 22. The diode 22 in FIG. 1 can be substituted by a parasitic diode 23 of the switch 25 or by an added Schottky diode. A switching signal $S_{W2}$, which is used for turning on/off the switch 25, is in inverse logic to the switching signal $S_{W1}$.

FIG. 3A~3D show the synchronous rectifying operation of the buck converter. Referring to FIG. 3A, when the switch 20 is turned on, a current $I_C$ is sourced from an input voltage $V_{IN}$ to an output capacitor 40 via the inductor 30 for generating the output voltage $V_O$. Therefore, the output voltage $V_O$ of the buck converter is obtained across the output capacitor 40, while energy is stored into the inductor 30 and the capacitor 40.

As shown in FIG. 3B, when the switch 20 and the switch 25 are both turned off, energy stored in the inductor 30 will be continuously supplied to the output of the buck converter via the parasitic diode 23 of the switch 25. After that, the switch 25 is turned on to reduce the power loss of its parasitic diode 23 as shown in FIG. 3C. Before turning on the switch 20 again for the next switching cycle, the switch 25 is turned off in advance to prevent short circuit due to cross conduction. Notwithstanding, the synchronous rectifying operation can improve the efficiency of the buck converter at heavy load condition but fails to overcome low efficiency at light load condition, which is caused by a backward discharging phenomenon. As FIG. 4 shows, under light load conditions, the energy stored in the inductor 30 will be fully discharged before the next switching cycle starts. The energy stored in the capacitor 40 will therefore be backward discharged via the inductor 30 and the switch 25.

Furthermore, under light load conditions, the major power losses of the buck converter are in direct proportion to the switching frequency F of the switching signal $S_{W1}$, such as the core loss of the inductor 30 and the switching losses of the switches 20 and 25. Another major loss of the buck converter is caused by the power consumption of the control circuit 10. A switching period T is a reciprocal of the switching frequency F, which can be shown as following equation:

$$T = 1/F = (T_{ON} + T_{OFF})$$

Where $T_{ON}$ and $T_{OFF}$ are respectively an on-time and an off-time of the switching signal $S_{W1}$.

Increasing the switching period T reduces the power losses. However, in order to shrink the size of inductors and capacitors, the switching frequency F is restricted to operate in a short switching period. A maximum on-time is also limited to prevent the saturation of the inductor. Therefore, increasing the off-time $T_{OFF}$ can extend the switching period T for light load conditions. Therefore, the power consumption of the buck converter is reduced in response to the increase of the switching period T under the light load and even no-load conditions.

SUMMARY OF THE INVENTION

It is an object of the present invention to provide a buck converter having power saving means to achieve high efficiency under both heavy load and light load conditions.

The present invention provides a buck converter, including a switching device, a synchronous rectifying switching device, and a feedback circuit. The switching device is used to control the power delivered to an output of the buck converter. The synchronous rectifying switching device provides the synchronous rectifying operation. The feedback circuit generates a feedback signal according to load conditions. In order to save the power and improve the efficiency of the buck converter under light load conditions, a first circuit generates an oscillation signal and a power saving signal in response to the feedback signal. In reference to this feedback signal and the oscillation signal, a second circuit generates a main switching signal and a secondary switching signal to respectively control the switching device and the synchronous rectifying switching device. An off-time of the main switching signal increases as the load decreases. The power saving signal is applied to turn off the synchronous rectifying switching device and parts of the control circuit of the buck converter during the off-time of the switching signal for further saving power under light load conditions. In order to reduce the acoustic noise, the main switching signal and the switching device are disabled before the switching frequency of the main switching signal falls into the audio band. The main switching signal can be enabled again by the feedback signal once the load increases and the switching frequency of the main switching signal is higher than the audio band.

DESCRIPTION OF THE PREFERRED EMBODIMENTS

Figure 6:
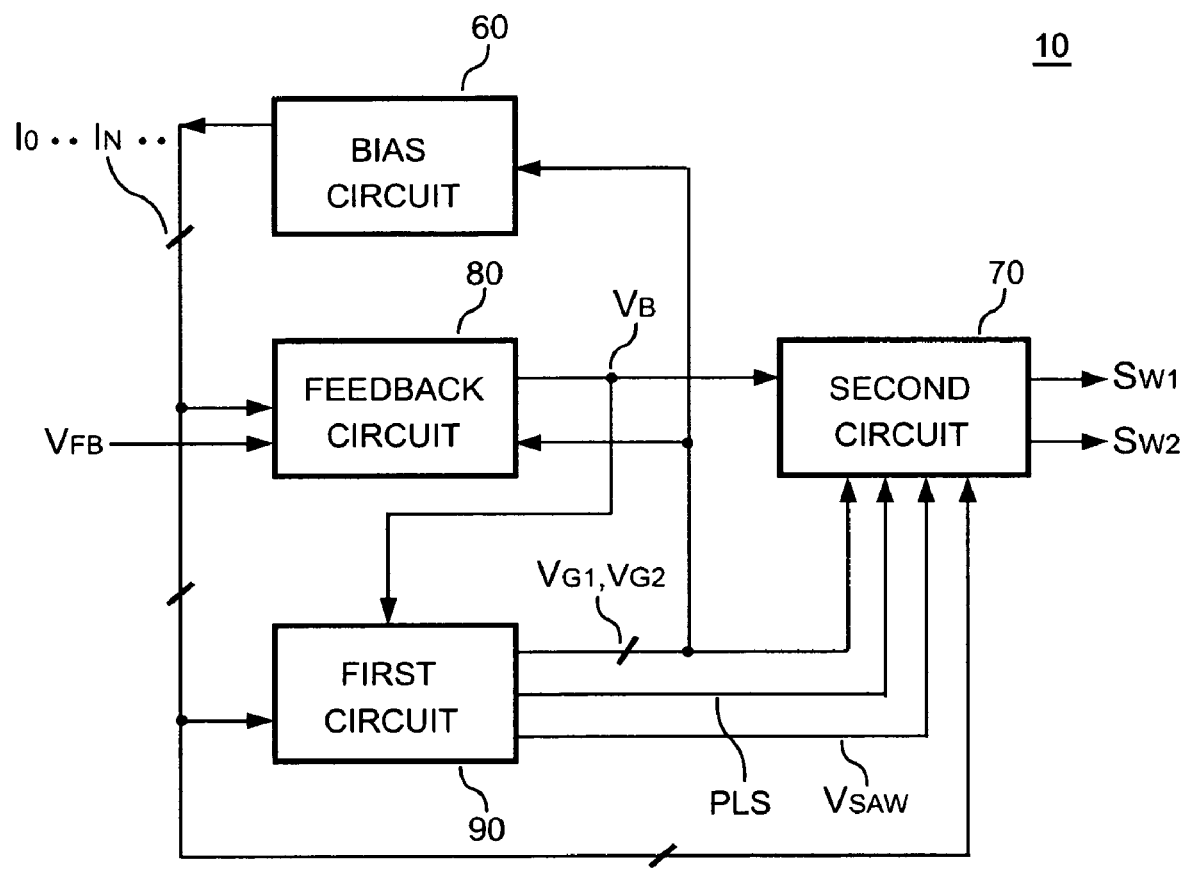
FIG. 6 shows a block diagram of a control circuit of the buck converter according to an embodiment of the present invention.

FIG. 6 shows a block diagram of a control circuit 10 of a buck converter according to an embodiment of the present invention. The control circuit 10 comprises a bias circuit 60, a feedback circuit 80, a first circuit 90, and a second circuit 70. The bias circuit 60 produces bias currents, $I_0 \ldots I_N$, for circuits of the buck converter. A voltage divider formed by resistors 51 and 52 is coupled from the output of the buck converter to a ground reference level for generating a signal $V_{FB}$, which is proportional to the output voltage $V_O$ of the buck converter, to the feedback circuit 80. The feedback circuit 80 further generates a feedback signal $V_B$ in response to the signal $V_{FB}$, which represents the load conditions. The first circuit 90 generates an oscillation signal PLS, a saw-tooth signal $V_{SAW}$, a power-saving signal $V_{G1}$, and an auxiliary control signal $V_{G2}$.

Figure 1:
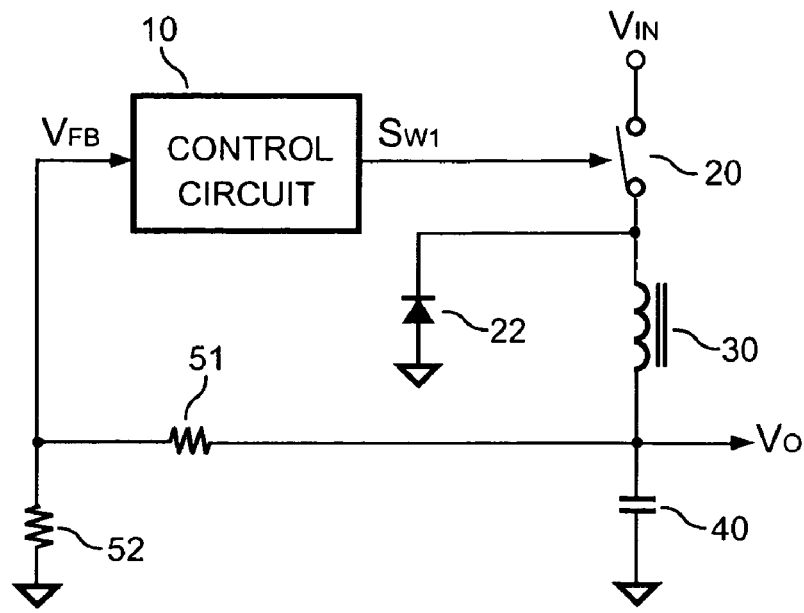
FIG. 1 shows a conventional buck converter.
Figure 2:
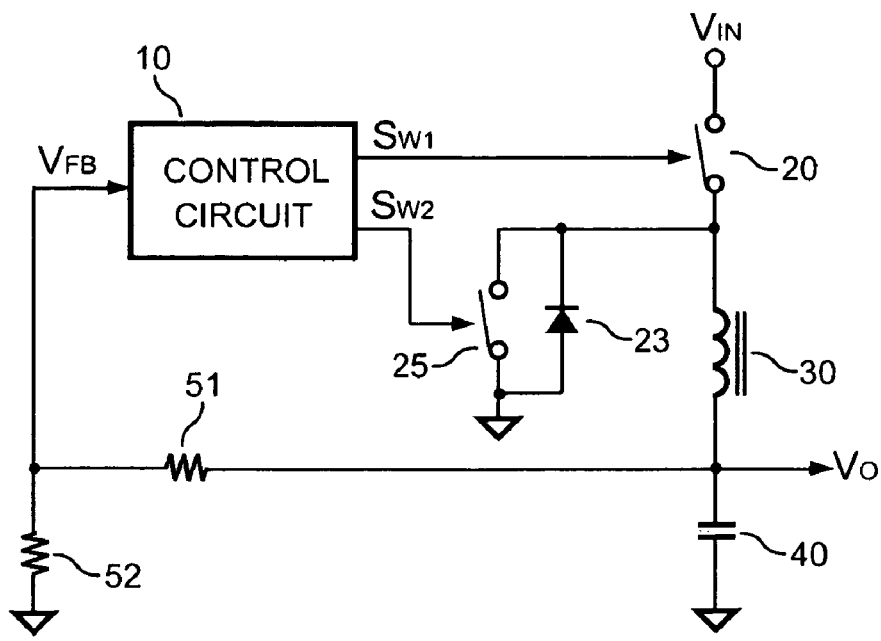
FIG. 2 shows a known buck converter having synchronous rectifying function.
Figure 3A:
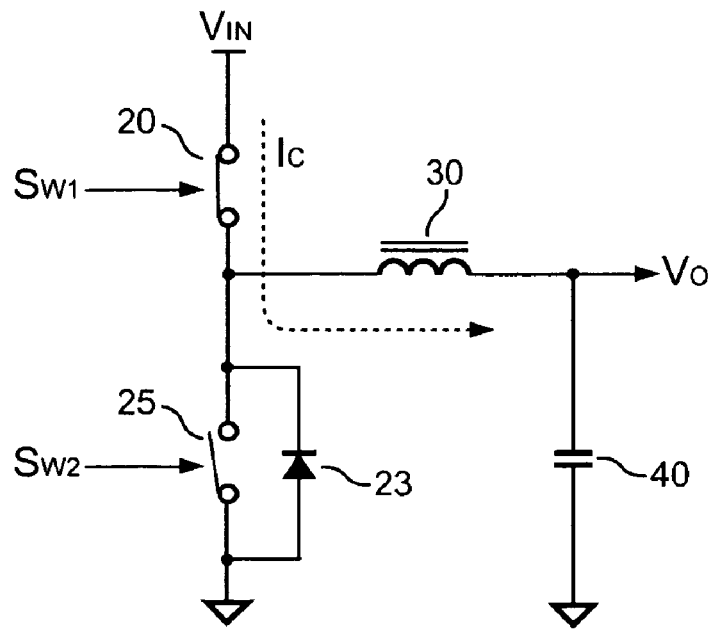
FIG. 3A~3D show the synchronous rectifying operation of the traditional buck converter shown in FIG. 2.
Figure 3B:
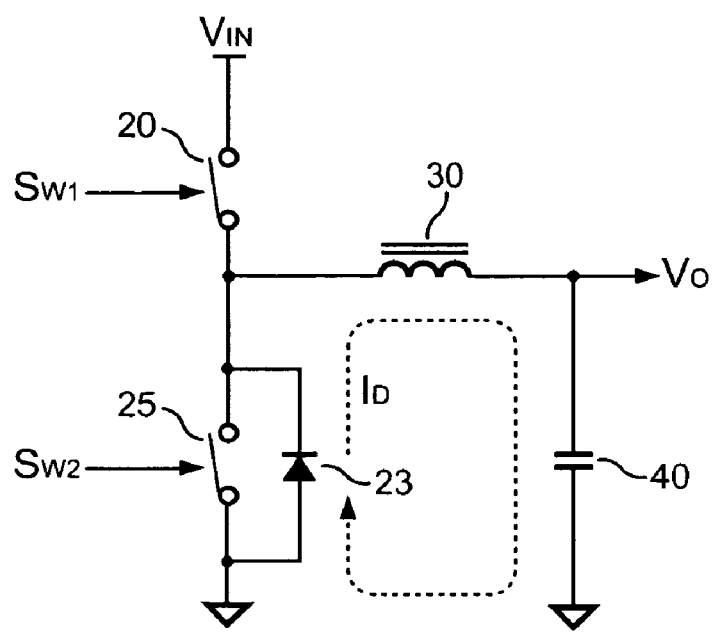
Figure 3C:
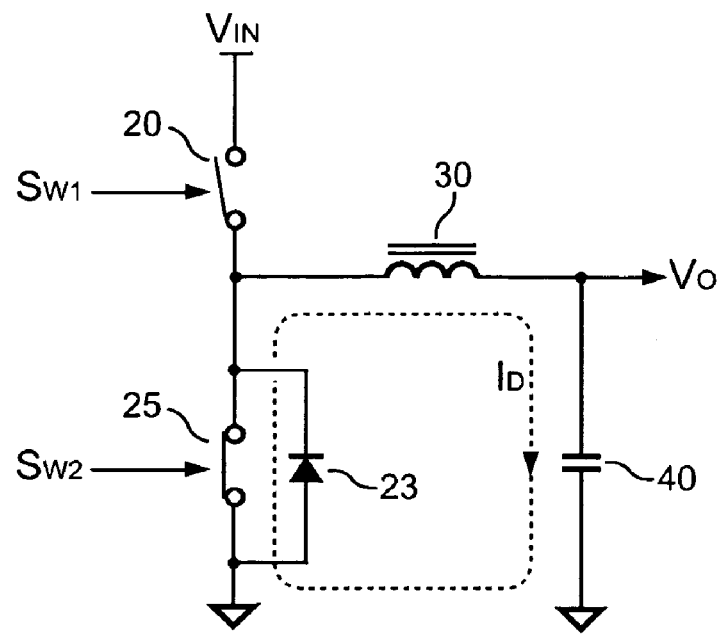
Figure 3D:
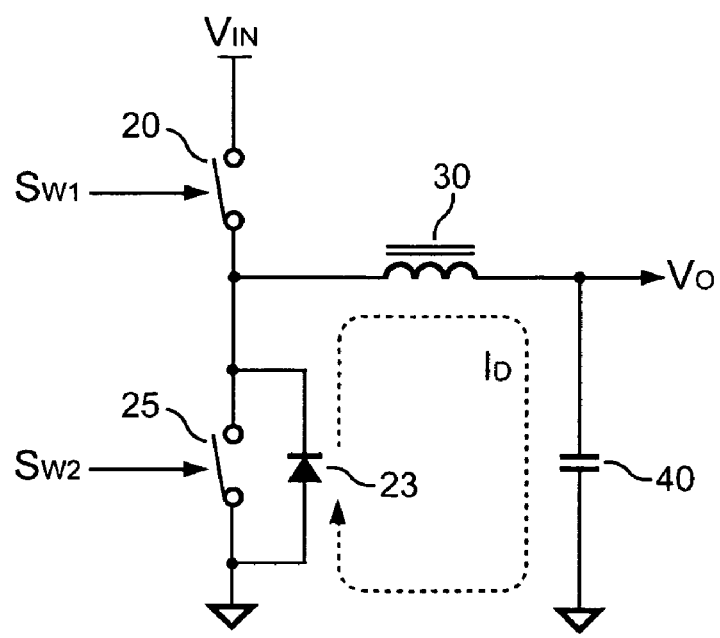
Figure 4:
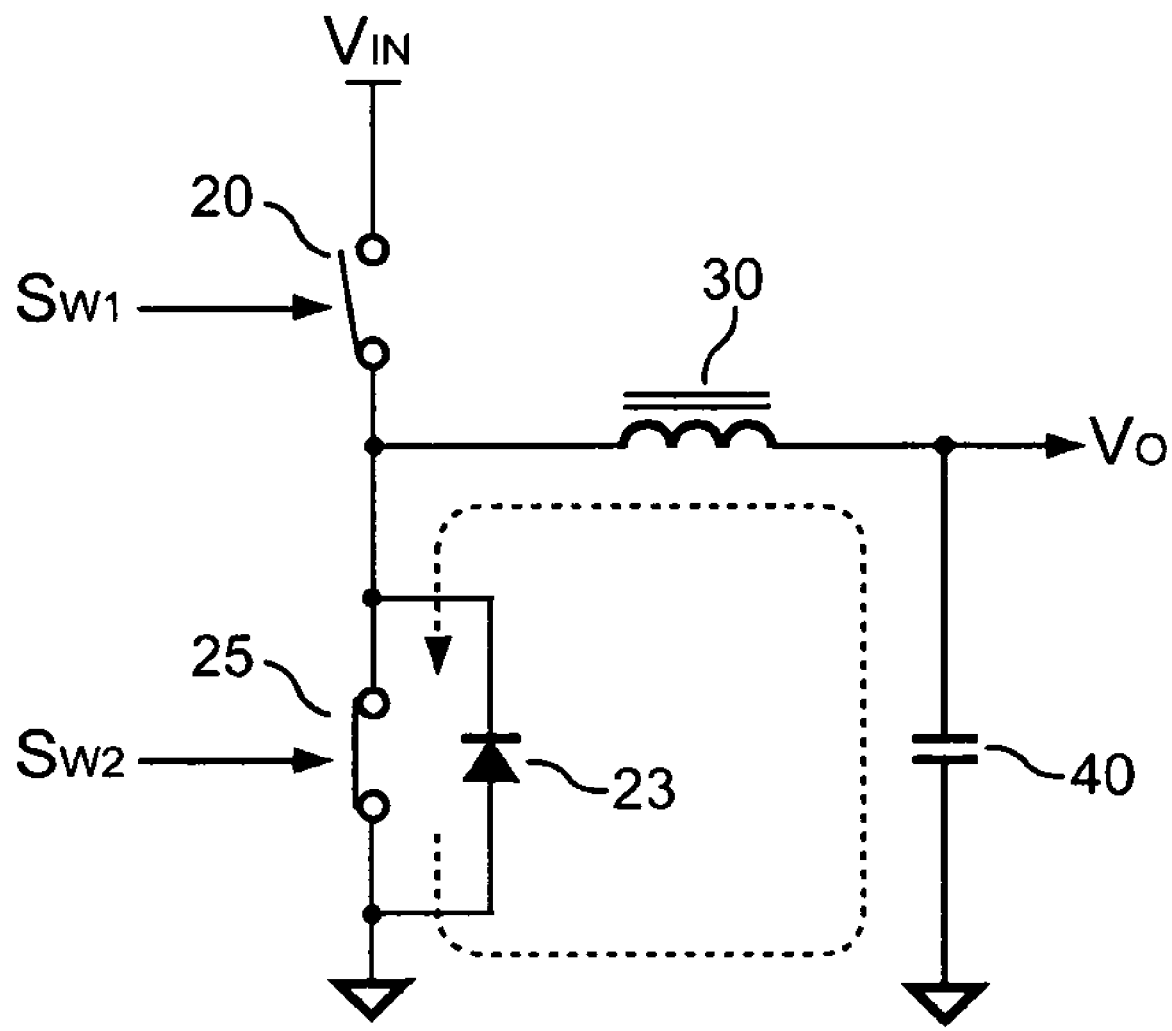
FIG. 4 shows a backward discharging operation under light load conditions of the buck converter shown in FIG. 2.
Figure 5A:
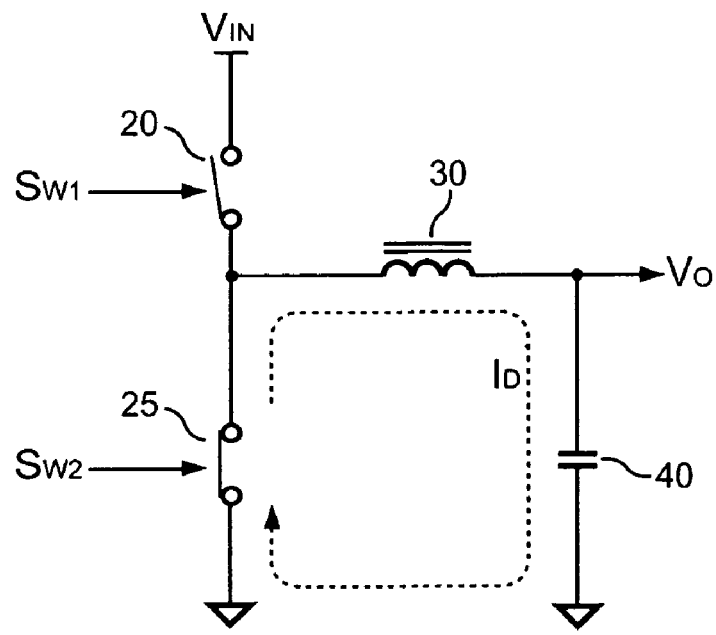
FIG. 5A shows a high efficiency buck converter operating under heavy load conditions.
Figure 5B:
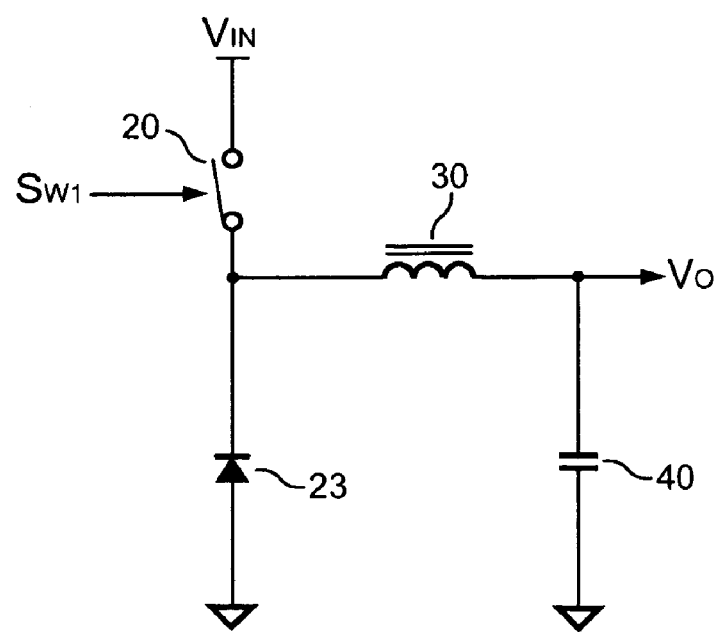
FIG. 5B shows the high efficiency buck converter operating under light load conditions.

Referring to FIG. 2 and FIG. 6, the second circuit 70 generates a main switching signal $S_{W1}$ and a secondary switching signal $S_{W2}$ in response to the feedback signal $V_B$ and the oscillation signal PLS to control the switching device 20 and the synchronous rectifying switching device 25. The switching device 20 is coupled to an input voltage $V_{IN}$ to control the power delivered to the output of the buck converter. An off-time $T_{OFF}$ of the main switching signal $S_{W1}$ increases as the load decreases. The power-saving signal $V_{G1}$ is used to turn off partial circuits of the buck converter during the off-time $T_{OFF}$ of the main switching signal $S_{W1}$ for saving power under light load conditions. The main switching signal $S_{W1}$ is disabled before the switching frequency thereof falls into audio band to avoid acoustic noises. The main switching signal $S_{W1}$ is enabled by the feedback signal $V_B$ once the load increases and the switching frequency of the main switching signal $S_{W1}$ becomes higher than the audio band. The auxiliary control signal $V_{G2}$ is used for disabling the secondary switching signal $S_{W2}$ to turn off the synchronous rectifying switching device 25 once the off-time $T_{OFF}$ of the main switching signal $S_{W1}$ is increased in response to the decrement of the load. Therefore, as respectively shown in FIG. 5A and FIG. 5B, the buck converter of the present invention operates as a buck converter having synchronous rectifying function under heavy load conditions, and operates as a conventional buck converter under light load conditions to improve the efficiency of the buck converter.

Figure 7:
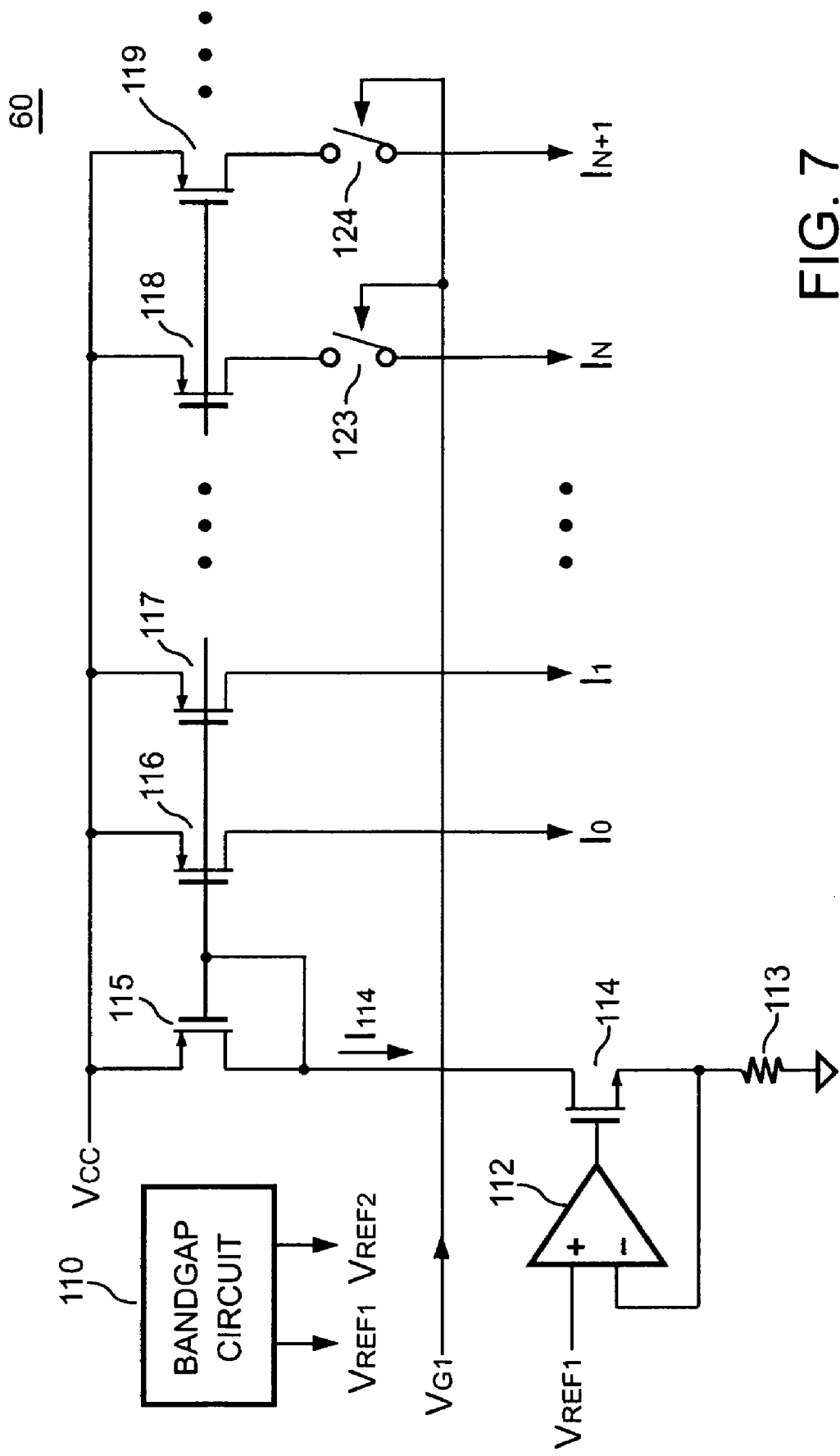
FIG. 7 shows a bias circuit of the control circuit according to an embodiment of the present invention.

FIG. 7 illustrates an embodiment of the bias circuit 60 of the control circuit 10 according to the present invention. The bias circuit 60 produces bias currents $I_0 \ldots I_N$. A bandgap circuit 110 generates reference voltages $V_{REF1}$ and $V_{REF2}$. The reference voltage $V_{REF1}$ is coupled to a first V-to-I converter formed by an operational amplifier 112, a resistor 113 and a transistor 114 to generate a constant current $I_{114}$ in response to the reference voltage $V_{REF1}$. A first current mirror formed by transistors 115, 116, 117, 118, and 119 generates bias currents $I_0 \ldots I_N$ in response to the constant current $I_{114}$. The bias currents $I_0 \ldots I_N$ power circuits of the buck converter. As shown in FIG. 7, the bias currents $I_{N+1}$ and $I_N$ are respectively enabled/disabled by switches 124 and 123 for saving power. The power-saving signal $V_{G1}$ turns on/off the switches 124 and 123. Therefore, the power saving signal $V_{G1}$ can turn off the circuits of the buck converter not operating during light load conditions.

Figure 8:
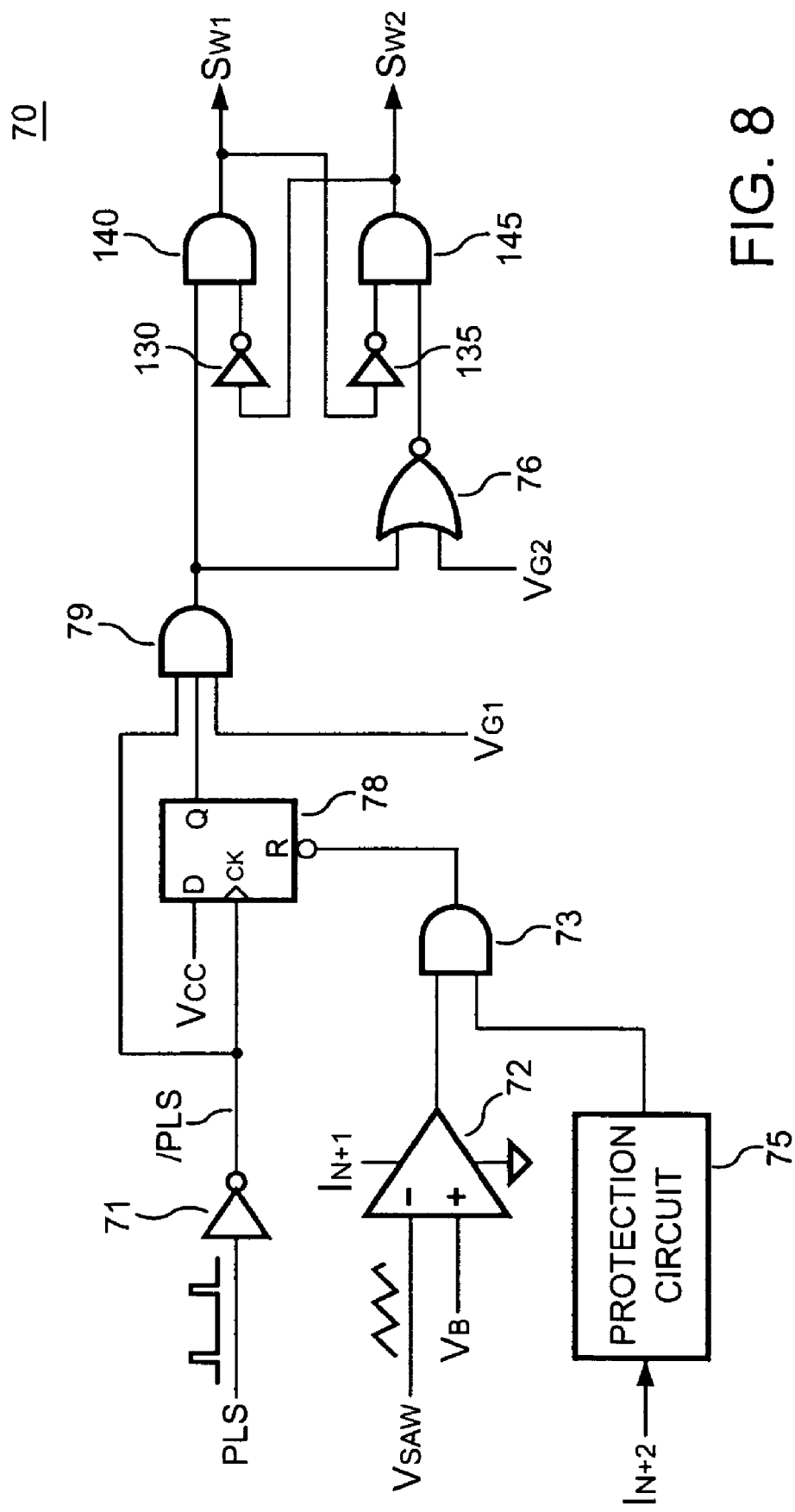
FIG. 8 shows a second circuit of the control circuit according to an embodiment of the present invention.

FIG. 8 shows the second circuit 70 according to a preferred embodiment of the present invention. The second circuit 70 includes a flip-flop 78 having a D-input supplied with a supply voltage $V_{CC}$, a clock input receiving an inverse oscillation signal /PLS from an inverter 71. The inputs of an AND gate 79 are coupled to an output of the flip-flop 78, the inverse oscillation signal /PLS and the power-saving signal $V_{G1}$. An output of the AND gate 79 is connected to an output buffer circuit to generate the main switching signal $S_{W1}$. The output buffer circuit is formed by AND gates 140, 145 and inverters 130, 135 for preventing the cross conduction of the switching devices 20 and 25. The main switching signal $S_{W1}$ is thus enabled in response to a falling edge of the oscillation signal PLS. Enabling the oscillation signal PLS and the power-saving signal $V_{G1}$ disables the main switching signal $S_{W1}$. An input of a NOR gate 76 is coupled to the output of the NAND 79. The secondary switching signal $S_{W2}$ is generated through the NOR gate 76 and the output buffer circuit. The phase of secondary switching signal $S_{W2}$ is therefore complementary to that of the main switching signal $S_{W1}$. Another input of the NOR gate 76 is supplied with the auxiliary control signal $V_{G2}$. The secondary switching signal $S_{W2}$ can thus be turned off as the auxiliary control signal $V_{G2}$ is enabled for saving power.

Further referring to FIG. 8, a comparator 72 has a negative input supplied with the saw-tooth signal $V_{SAW}$. A positive input of the comparator 72 is supplied with the feedback signal $V_B$ to achieve feedback loop control. An output of the comparator 72 is coupled to an input of an AND gate 73. An output of the AND gate 73 is coupled to a reset input of the flip-flop 78. Another input of the AND gate 73 is coupled to an output of a protection circuit 75. The protection circuit 75 includes over-voltage, over-current, and over-temperature protections, which protect the buck converter and the connected circuits thereof from abnormal conditions. Therefore, the main switching signal $S_{W1}$ can be disabled by the protection circuit 75 and the feedback signal $V_B$.

A bias current $I_{N+2}$ and a bias current $I_{N+1}$ respectively power the protection circuit 75 and the comparator 72. Under light load conditions, the bias currents $I_{N+2}$ and $I_{N+1}$ are disabled to turn off the protection circuit 75 and the comparator 72 for further reducing power consumption to save power.

Figure 9:
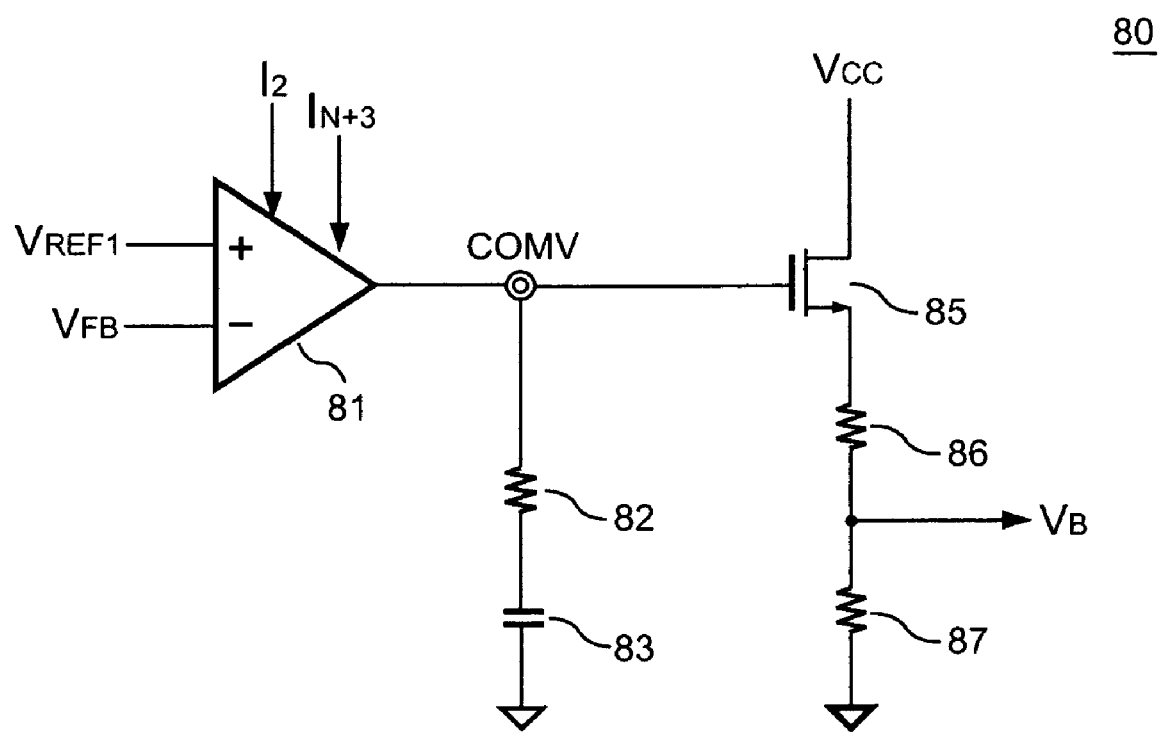
FIG. 9 shows a feedback circuit of the control circuit according to an embodiment of the present invention.

FIG. 9 shows the feedback circuit 80 of the control circuit 10 according to a preferred embodiment of the present invention. The feedback circuit 80 includes a trans-conductance error amplifier 81 having a positive input supplied with the reference voltage $V_{REF1}$. A negative input of the error amplifier 81 is supplied with the signal $V_{FB}$. A resistor 82 and a capacitor 83 are coupled to an output of the error amplifier 81 for frequency compensation. A gate of a level-shift transistor 85 is connected to the output of the trans-conductance error amplifier 81. A source of the level-shift transistor 85 connects to an attenuator formed by a resistor 86 and a resistor 87 for producing the feedback signal $V_B$. The error amplifier 81 is powered by the bias current I2 and $I_{N+3}$. The bias current $I_{N+3}$ is disabled to save power consumption of the error amplifier 81 under light load conditions.

Figure 10:
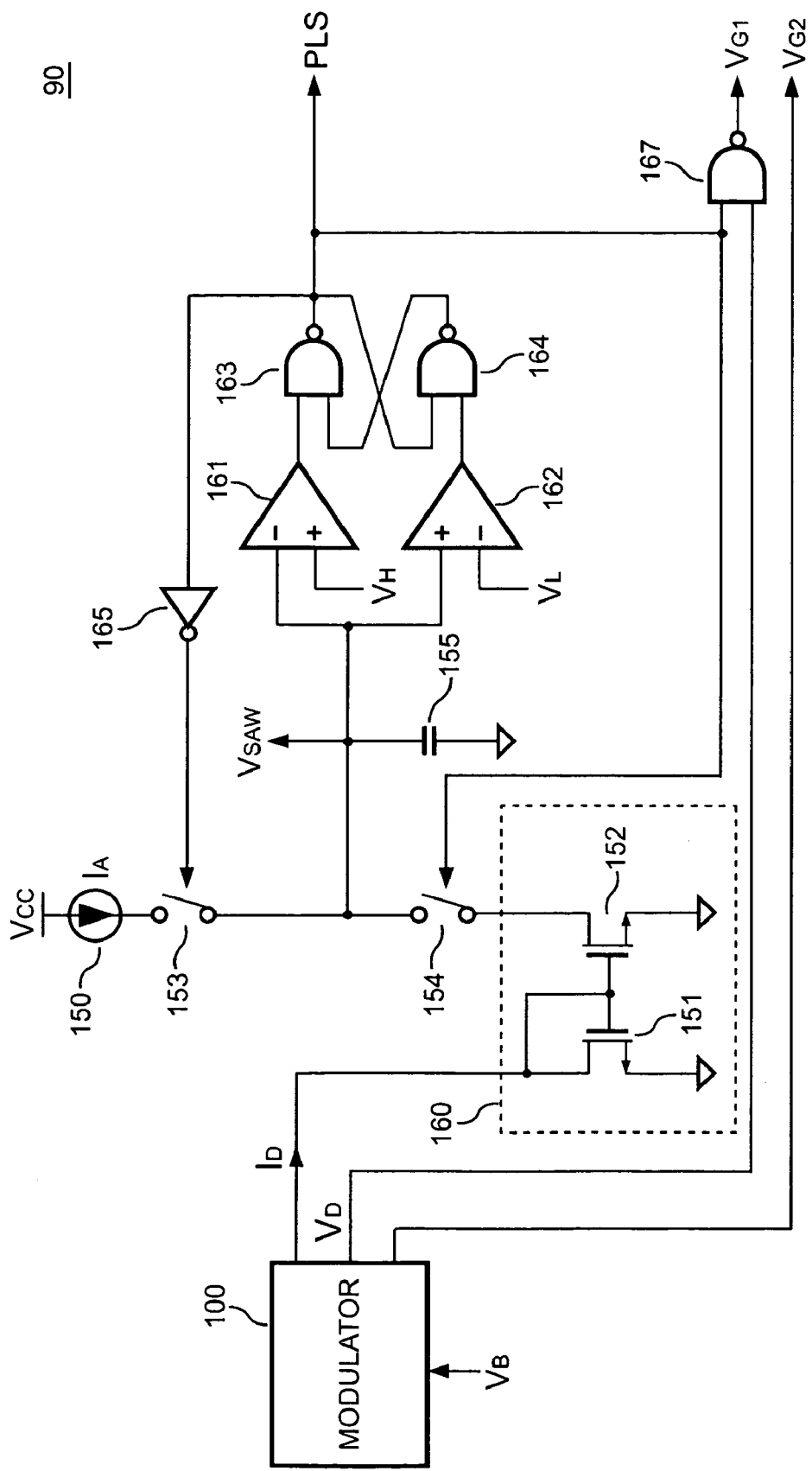
FIG. 10 shows a first circuit of the control circuit according to an embodiment of the present invention.

FIG. 10 shows the first circuit 90 of the control circuit 10 according to a embodiment of the present invention. The first circuit 90 comprises a modulator 100, an oscillation circuit, and a power-saving circuit. The modulator 100 is supplied with the feedback signal $V_B$ to generate a discharge current $I_D$, a light-load signal $V_D$ and the auxiliary control signal $V_{G2}$ in response to the feedback signal $V_B$. The oscillation circuit includes a charge current source 150, a discharge current source 160, a charge switch 153, a discharge switch 154, a capacitor 155 and an oscillation control circuit to generate the oscillation signal PLS and the saw-tooth signal $V_{SAW}$. A power-saving circuit formed by a NAND gate 167 has its two inputs respectively supplied with the oscillation signal PLS and the light-load signal $V_D$ to generate the power-saving signal $V_{G1}$. The discharge current source 160 is implemented by a first current mirror circuit formed by transistors 151 and 152, the discharge current $I_D$ is coupled to the oscillation control circuit via the current mirror circuit. The charge switch 153 is coupled between the charge current source 150 and the capacitor 155. The discharge switch 154 is connected between the capacitor 155 and the output of the discharge current source 160. The oscillation control circuit includes a comparator 161 having a high-threshold voltage $V_H$; a comparator 162 having a low-threshold voltage $V_L$; NAND gates 163 and 164, and an inverter 165. The comparators 161 and 162 are connected to the capacitor 155. The outputs of the comparators 161 and 162 are connected to a latch circuit formed by NAND gates 163 and 164 to generate the oscillation signal PLS. The oscillation signal PLS controls the discharge switch 154 and controls the charge switch 153 via the inverter 165. By alternatively switching the charge switch 153 and the discharge switch 154, the oscillation is therefore achieved.

The discharge current $I_D$ decreases as the load decreases. An enable time of the oscillation signal PLS increases as the discharge current $I_D$ decreases. The light-load signal $V_D$ is enabled once the load is lower than a threshold value. The power-saving signal $V_{G1}$ is therefore generated as the light-load signal $V_D$ and the oscillation signal PLS are enabled. A charge current $I_A$ of the charge current source 150 and a capacitance of the capacitor 155 determine the maximum on-time $T_{ON}$ of the main switching signal $S_{W1}$. The discharge current $I_D$ and the capacitance of the capacitor 155 determine the off-time $T_{OFF}$ of the main switching signal $S_{W1}$. The charge current $I_A$ is a constant current, and the discharge current $I_D$ changes responsive to the loads.

Figure 11:
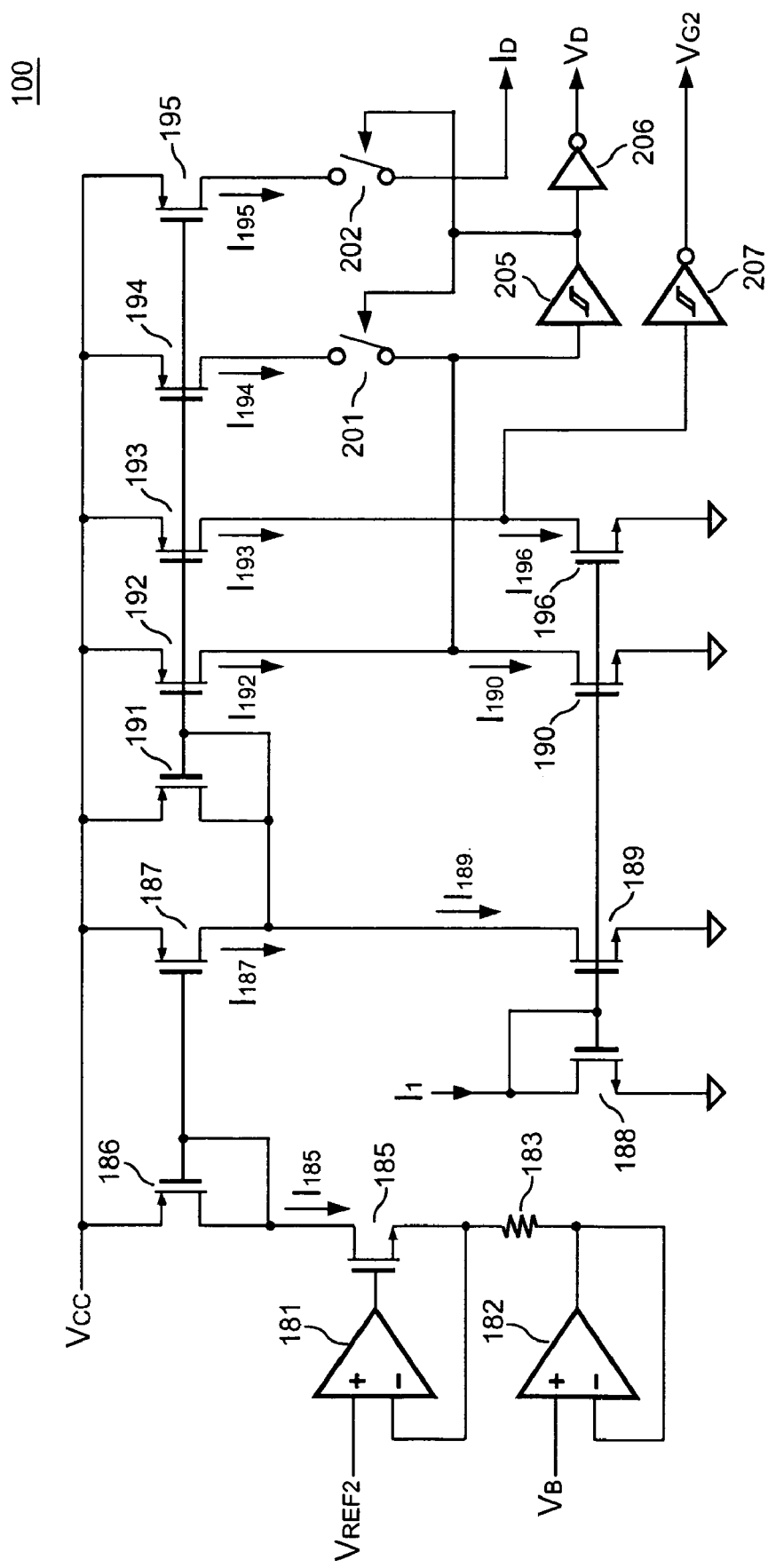
FIG. 11 shows a modulator of the first circuit according to an embodiment of the present invention.

FIG. 11 shows the modulator 100 of the first circuit 90 according to an embodiment of the present invention. The modulator 100 comprises an operational amplifier 182 supplied with the feedback signal $V_B$. An operational amplifier 181 is supplied with the reference voltage $V_{REF1}$. A transistor 185 and a resistor 183 form a second V-to-I converter in combination with the operational amplifiers 181 and 182 to generate a current $I_{185}$. Once the feedback signal $V_B$ is lower than the reference voltage $V_{REF2}$, the current $I_{185}$ increases in response to the decrement of the feedback signal $V_B$. A second current mirror circuit formed by transistors 186 and 187 receives the current $I_{185}$ to generate a current $I_{187}$. The bias current $I_1$, which is a constant current, is supplied to a third current mirror circuit formed by transistors 188, 189, 190 and 196 to generate a current $I_{189}$, a current $I_{190}$ and a current $I_{196}$. The drain of the transistor 187 connects the drain of the transistor 189. A fourth current mirror circuit formed by transistors 191, 192, 193, 194 and 195 receives the differential current of the current $I_{189}$ and the current $I_{187}$ to produce a current $I_{192}$, a current $I_{193}$, a current $I_{194}$ and a current $I_{195}$. A drain of the transistor 192 connects a drain of the transistor 190. A drain of the transistor 193 connects a drain of the transistor 196. An input of an inverter 207 is coupled to the drain of the transistor 193. An output of the inverter 207 produces the auxiliary control signal $V_{G2}$. A first terminal of a switch 201 is coupled to the transistor 194 for receiving the current $I_{194}$. A second terminal of a switch 201 is coupled to an input of a buffer circuit 205. A differential current of the current $I_{192}$ and the current $I_{190}$ is supplied to the input of the buffer circuit 205. A switch 202 is coupled to the transistor 195 to produce the discharge current $I_D$ An output of the buffer circuit 205 turns on/off the switches 201 and 202. An inverter 206 is coupled to the output of the buffer circuit 205 to generate the light-load signal $V_D$. The threshold level of the light-load signal $V_D$ is adjustable to eliminate the acoustic noise. The discharge current $I_D$ determines the switching frequency of the main switching signal $S_{W1}$. When the switching frequency of the main switching signal $S_{W1}$ falls into audio band, the switch 202 would be turned off to disable the discharge current $I_D$ and the switching signal $S_{W1}$ to eliminate the acoustic noise. The switch 202 can be turned on by the feedback signal $V_B$ to enable the discharge current $I_D$ again as the load increases and make the switching frequency of the main switching signal $S_{W1}$ is higher than the audio band.

Figure 12:
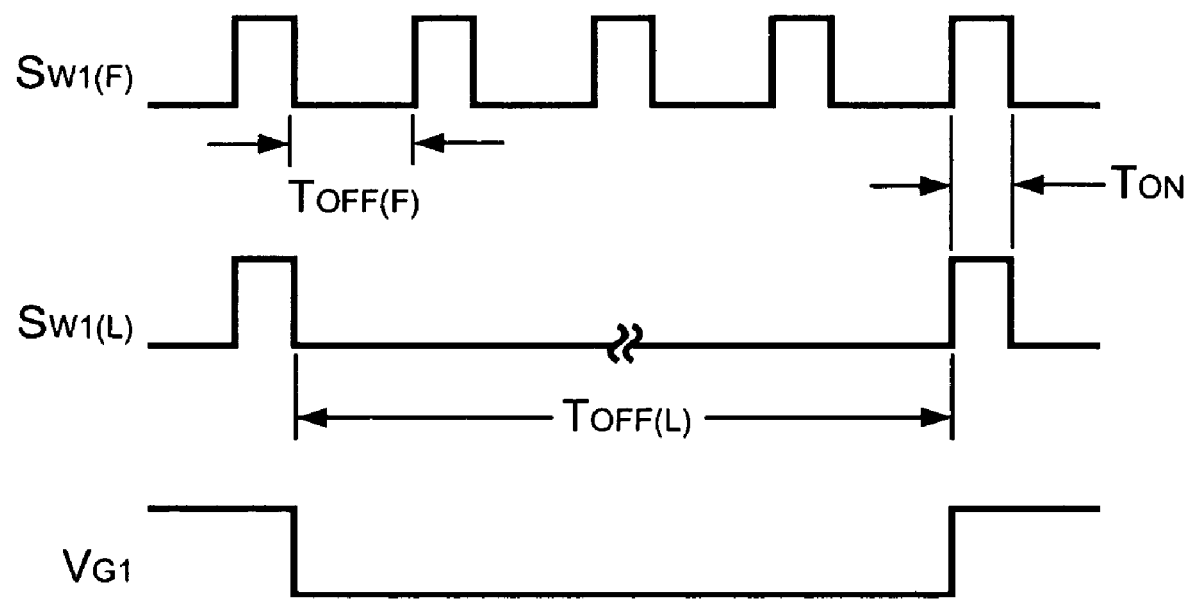
FIG. 12 shows waveforms of switching signals according to the present invention.

FIG. 12 shows waveforms of the main switching signal $S_{W1}$ according to the present invention. The $S_{W1(F)}$ represents the main switching signal under heavy load conditions, and the $S_{W1(L)}$ represents the switching signal under light load conditions. As the oscillation signal PLS is enabled, the main switching signal $S_{W1}$ is disabled to provide a programmable off-time $T_{OFF}$. The maximum on-time $T_{ON}$ of the main switching signal $S_{W1}$ is fixed for preventing the saturation of magnetic elements.

It should be noted that the above-mentioned embodiments illustrate rather than limit the invention, and it will be apparent to those skilled in the art that various modifications and variations can be made to the structure of the present invention without departing from the scope or spirit of the invention.

What is claimed is:

1. A buck converter having power saving means, comprising:
    a switching device, coupled to an input of the buck converter and for controlling a power delivered to an output of the buck converter;
    an auxiliary switching device, connected to said switching device for synchronous rectifying;
    a feedback circuit, coupled to said output of said buck converter, for generating a feedback signal in response to load conditions;
    a first circuit, generating both an oscillation signal and a power-saving signal in response to said feedback signal; and
    a second circuit, generating a main switching signal and an auxiliary switching signal to respectively control said switching device and said auxiliary switching device in response to said feedback signal and said oscillation signal, wherein an off-time of said main switching signal increases as the load decreases, said power-saving signal being applied to turn off switching devices and parts of control circuits of said buck converter for saving power under light load conditions.

2. The buck converter as claimed in claim 1, wherein said main switching signal is disabled before a switching frequency of said main switching signal falls into audio band to eliminate acoustic noises.

3. The buck converter as claimed in claim 1, wherein said first circuit comprises:
    a modulator, coupled to said feedback signal for generating a discharge current and a light-load signal in response to said feedback signal;

an oscillation circuit, including a charge current source, a discharge current source, a charge switch, a discharge switch, a capacitor and an oscillation control circuit to generate said oscillation signal; and a power-saving circuit, coupled to said oscillation signal and said light-load signal to generate said power-saving signal, wherein said discharge current decreases as the load decreases, an enable time of said oscillation signal being increased in response to a decrement of said discharge current, wherein said light-load signal is enabled once the load is lower than a threshold value, and said power-saving signal is generated when said light-load signal and said oscillation signal are enabled.

4. The buck converter as claimed in claim 1, wherein as said oscillation signal is enabled, said main switching signal is off and said off-time thereof varies in response to load variations, a maximum on-time of said main switching signal being fixed to prevent the saturation of magnetic elements.

5. The buck converter as claimed in claim 3, wherein said modulator comprises:

a first operational amplifier, coupled to said feedback signal;

a second operational amplifier, connected to a reference voltage;

a V-to-I converter, formed by a transistor and a resistor in combination with said first operational amplifier and said second operational amplifier, said V-to-I converter generating a first current, said first current being increased as said feedback signal decreases once said feedback signal is lower than said reference voltage;

a first current mirror, receiving said first current to generate a second current;

a constant current source;

a second current mirror, coupled to said constant current source to generate a third current and a fourth current, wherein said first current mirror and said second current mirror are coupled through said second current and said third current respectively;

a third current mirror, receiving a differential current of said second current and said third current for producing a fifth current, a sixth current and a seventh current, wherein said first current mirror and said third current mirror are coupled through said fifth current and said fourth current respectively;

a first switch, having a first terminal and a second terminal, said first terminal fo said first switch being supplied with said sixth current;

a second switch, having a first terminal and a second terminal, said first terminal of said second switch being supplied with said seventh current and said second terminal of said second switch producing said discharge current;

a buffer circuit, having an input terminal and an output terminal, said input terminal of said buffer circuit being supplied with a differential current of said fifth current and said fourth current, said input terminal of said buffer circuit further connecting to said second terminal of said first switch, said output terminal of said buffer circuit turning on/off said first switch and said second switch; and an inverter, having an input terminal connected to said output terminal of said buffer circuit, and having an output terminal to generate said light-load signal.

6. A switching regulator having power saving means, comprising:

a switching device, coupled to an input of said switching regulator to control a power delivered to an output of said switching regulator;

a feedback circuit, coupled to said output of said switching regulator for generating a feedback signal;

a first circuit, generating an oscillation signal in response to said feedback signal; and a second circuit, generating a switching signal to control said switching device in response to said feedback signal and said oscillation signal, wherein a switching frequency of said switching signal varies in response to the variation of said feedback signal, an off-time of said switching signal being increased as the load decreases to save power, a maximum on-time of said switching signal being fixed to prevent the saturation of magnetic elements.

7. The buck converter as claimed in claim 6, wherein said switching signal is disabled before said switching frequency of said switching signal falls into audio band to eliminate acoustic noises.

8. The buck converter as claimed in claim 6, wherein said first circuit comprises:

a modulator, coupled to said feedback signal for generating a discharge current in response thereto; and an oscillation circuit, including a charge current source, a discharge current source, a charge switch, a discharge switch, a capacitor and an oscillation control circuit to generate said oscillation signal, wherein said discharge current decreases as the load decreases, wherein an enable time of said oscillation signal increases as said discharge current decreases.

9. The buck converter as claimed in claim 6, wherein as said oscillation signal is enabled, said switching signal is off and said off-time thereof varies in response to load variations.

10. A power saving control means used for a power converter, comprising:

a feedback circuit, coupled to an output of said power converter for generating a feedback signal in response to load variations;

a first circuit, generating a power-saving signal in response to said feedback signal under light load conditions, and generating an oscillation signal in response to said feedback signal; and a second circuit, generating a switching signal to control a power delivered to a load of said power converter in response to said feedback signal, wherein said power-saving signal stops said power delivering and turns off parts of circuits of said power converter.

11. The buck converter as claimed in claim 10, wherein said first circuit comprises:

a modulator, receiving said feedback signal to generate a light-load signal;

an oscillation circuit, including a charge current source, a discharge current source, a charge switch, a discharge switch, a capacitor and an oscillation control circuit to generate said oscillation signal; and a power-saving circuit, coupled to said oscillation signal and said light-load signal to generate said power-saving signal, wherein said light-load signal is enabled once the load is lower than a threshold value, and said power-saving signal is generated when said light-load signal and said oscillation signal are enabled.

* * * * *

UNITED STATES PATENT AND TRADEMARK OFFICE
CERTIFICATE OF CORRECTION

PATENT NO. : 7,482,788 B2 Page 1 of 1
APPLICATION NO. : 11/247209
DATED : January 27, 2009
INVENTOR(S) : Ta-Yung Yang It is certified that error appears in the above-identified patent and that said Letters Patent is hereby corrected as shown below:

On the Title Page, Item (75)
Please change the inventor name from "Ta Yang YANG" to -- Ta-Yung YANG --.

Signed and Sealed this

Twelfth Day of May, 2009

JOHN DOLL
*Acting Director of the United States Patent and Trademark Office*